United States Patent [19]

Klopfenstein et al.

[11] 4,100,984
[45] Jul. 18, 1978

[54] NET WEIGHER WITH BUILT-IN CHECKWEIGHER

[75] Inventors: King L. Klopfenstein, Prospect Heights; Robert H. Connors, Chicago, both of Ill.

[73] Assignee: Triangle Package Machinery Co., Chicago, Ill.

[21] Appl. No.: 702,354

[22] Filed: Jul. 2, 1976

[51] Int. Cl.² .................................. G01G 13/04
[52] U.S. Cl. ................................ 177/50; 177/123
[58] Field of Search ............... 177/123, 122, 116, 50, 177/1

[56] References Cited

U.S. PATENT DOCUMENTS

| | | | |
|---|---|---|---|
| 3,254,728 | 6/1966 | Aquadro | 177/122 X |
| 3,608,656 | 12/1968 | Pettis | 177/122 X |
| 3,643,752 | 2/1972 | Blodgett | 177/122 |
| 3,805,903 | 4/1974 | Muskat | 177/50 |
| 3,837,415 | 9/1974 | Connors | 177/123 |

*Primary Examiner*—Joseph W. Hartary
*Attorney, Agent, or Firm*—Emrich, Root, O'Keeffe & Lee

[57] ABSTRACT

Apparatus for controlling the weight of product charges fed to a receptacle, such as a weigh bucket associated, for example, with a packaging machine, in order to minimize product giveaway, is disclosed, wherein there is but a single receptacle to which the product is fed, and the product is check-weighed one or more times before being discharged from the receptacle. Flow of product to the receptacle is stopped when a predetermined feed cut-off weight is sensed by weighing means, and the product is then checkweighed. If the weight being sensed is less than the minimum package weight allowed or desired, one or more additional charges of product may be fed to the receptacle, and when the desired weight is reached, which may be equal to or above the minimum package weight, product is discharged. The additional charges of product fed to the receptacle after a checkweighing operation may comprise either a pulsed feed or a continuous feed until minimum package weight is reached. Also embodied as a part of the invention is a servo system for automatically adjusting the feed cut-off setting of the weighing means either up or down, depending upon the number of charges of product within a group of charges which fall above or below the minimum package weight setting.

13 Claims, 11 Drawing Figures

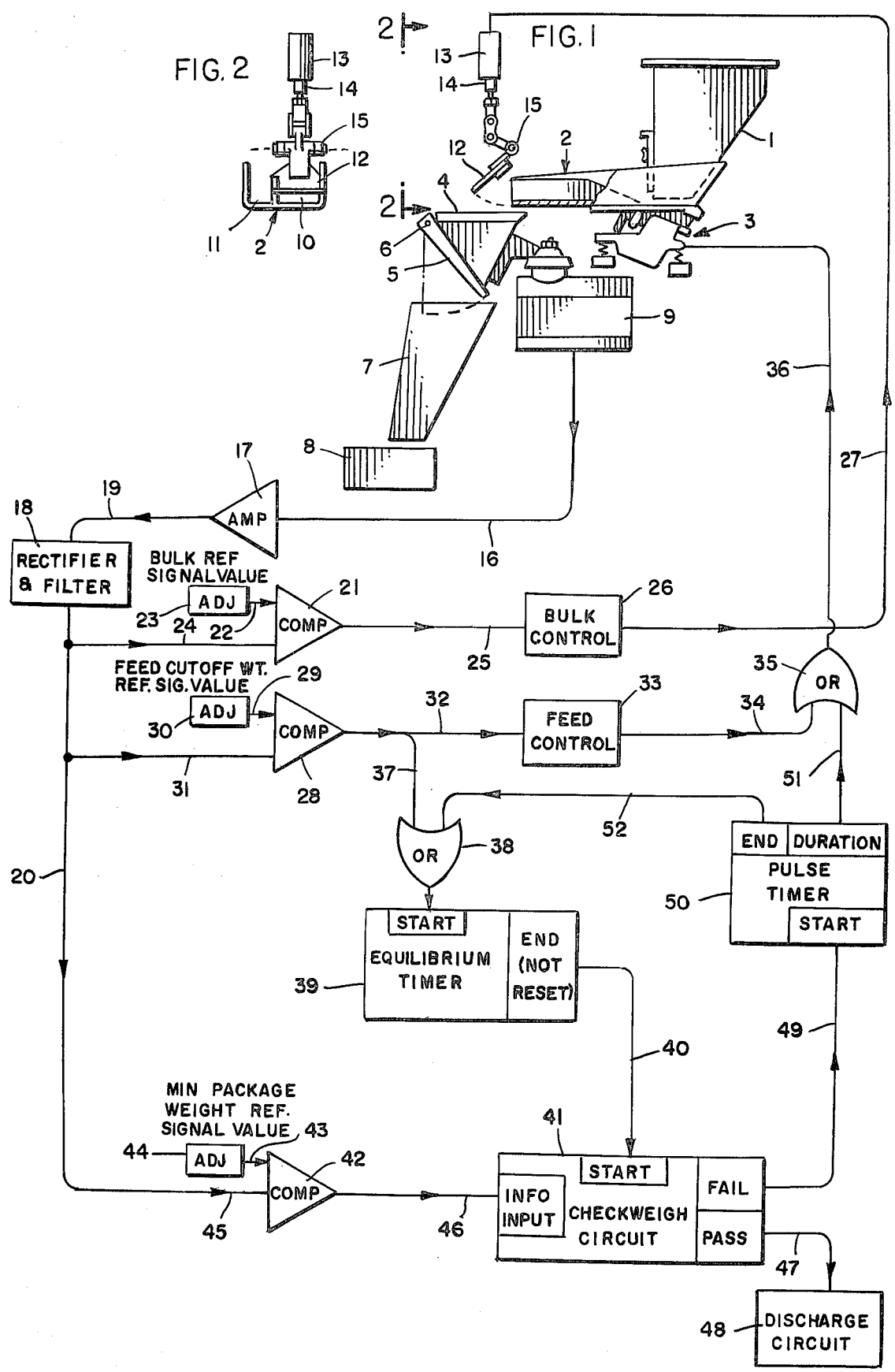

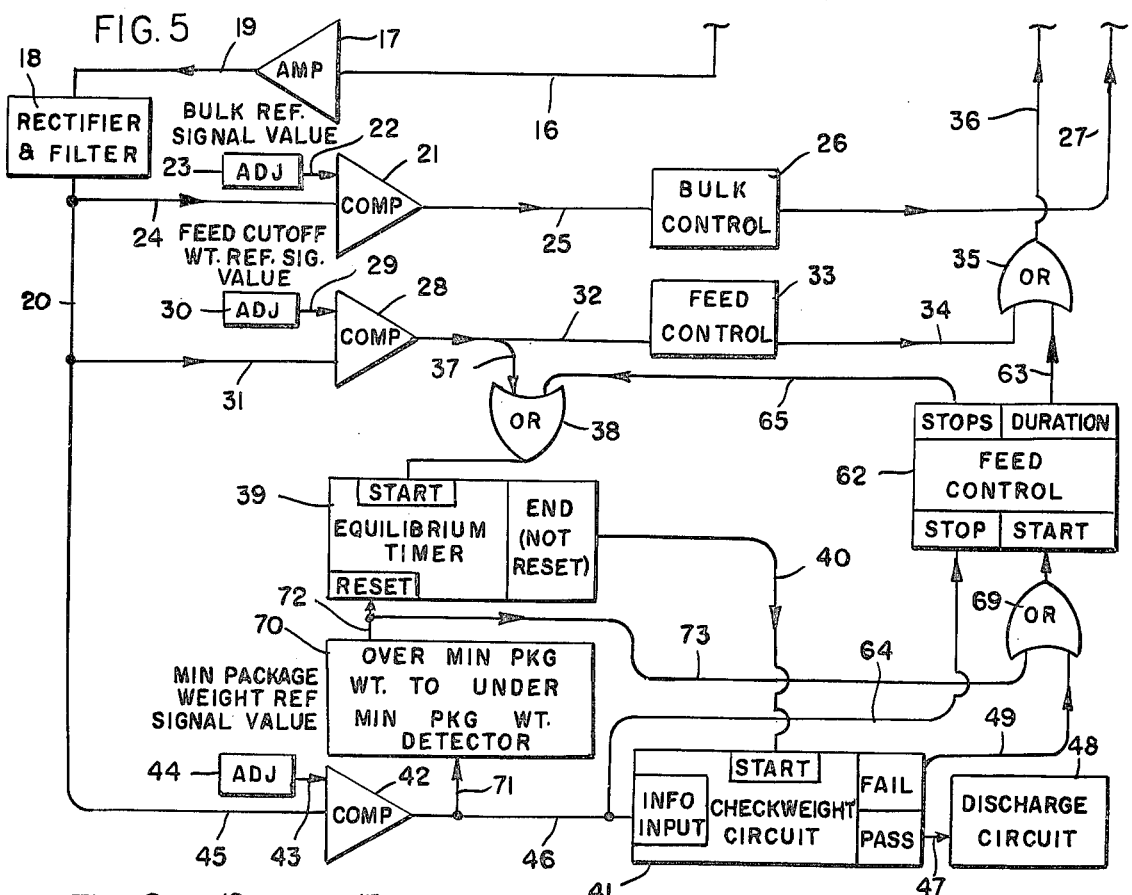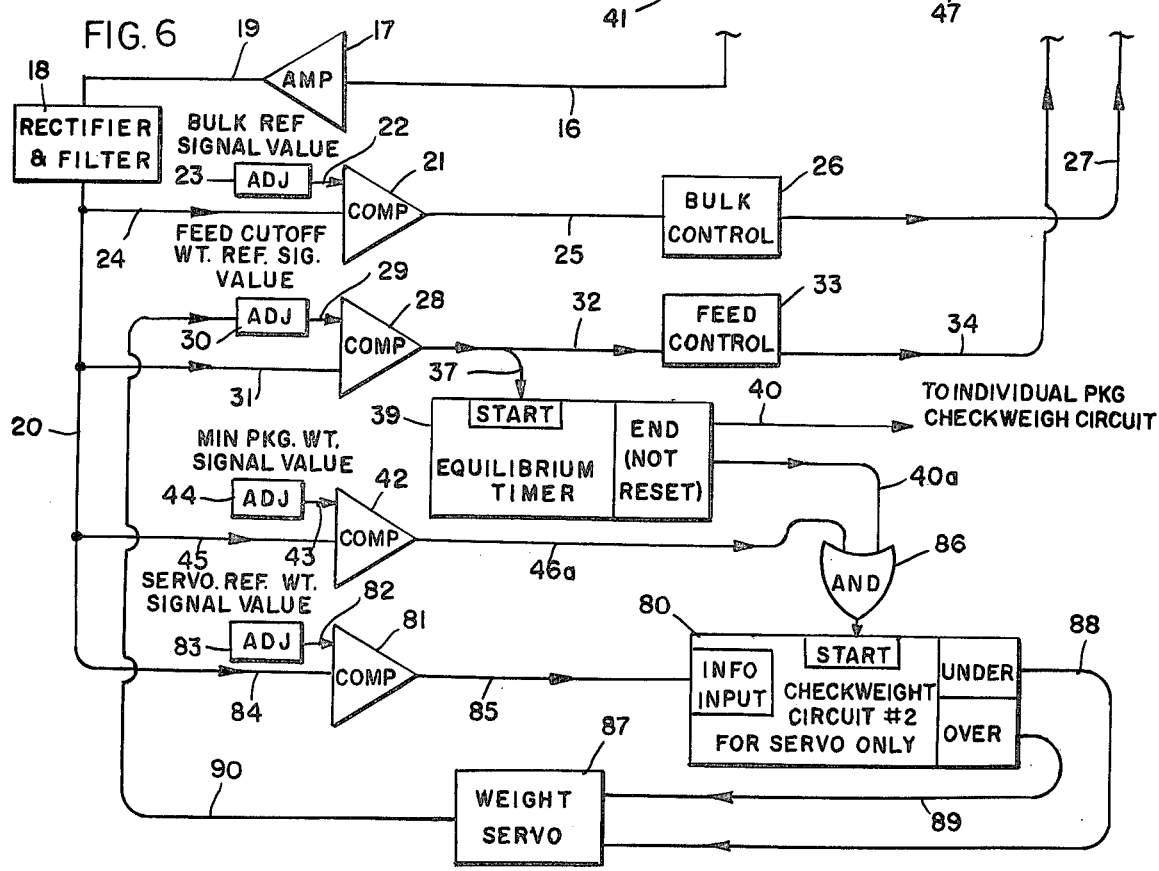

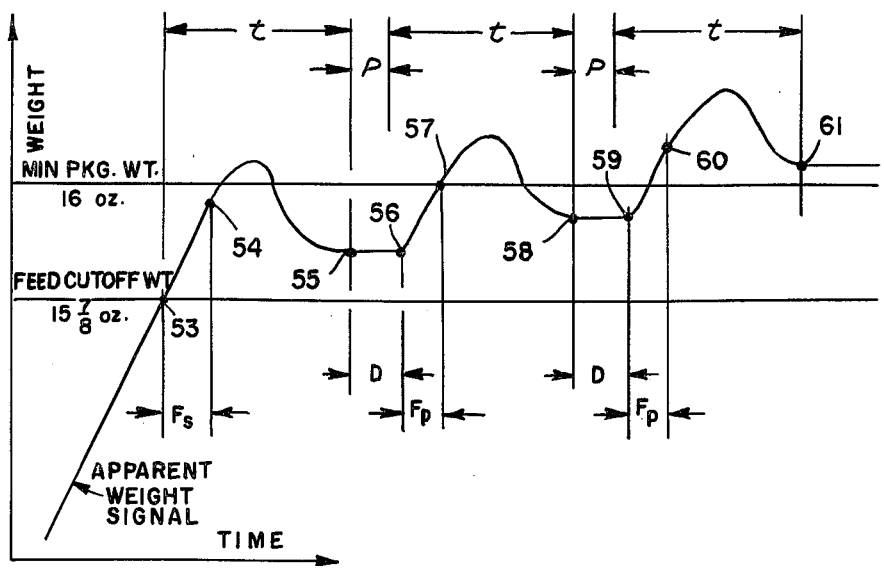
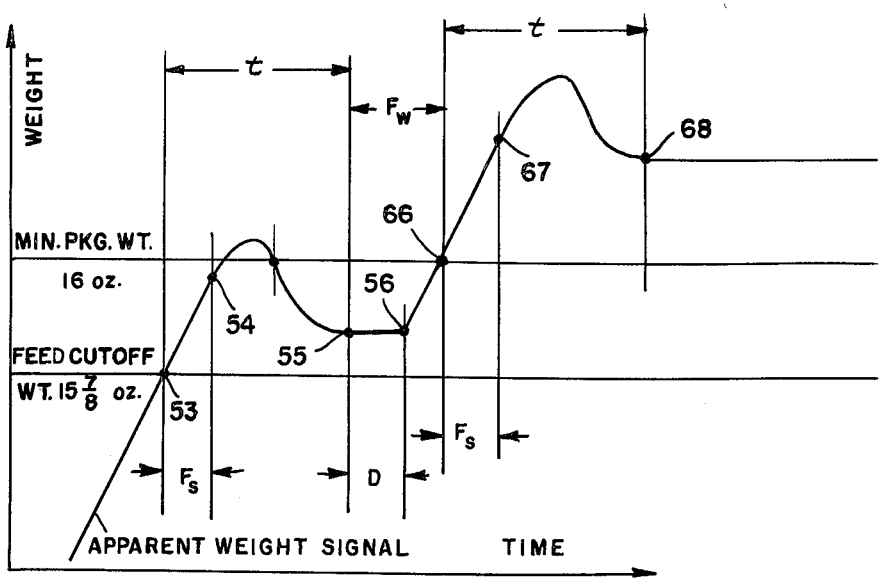
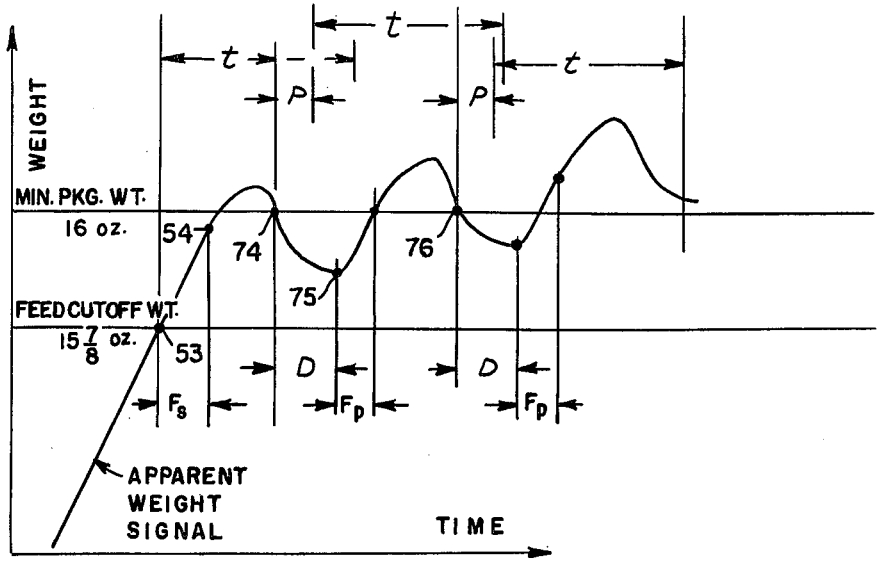

NET WEIGHER WITH BUILT-IN CHECKWEIGHER

BACKGROUND OF THE INVENTION

It is a well recognized serious problem in the packaging industry that package filling machines, even though set to dispense a change at a given weight, will produce packages of varying weights. Ideally, package filling machines would produce packages none of which are underweight, and all of which are either at the minimum package weight desired, or in excess thereof by such a small amount that "giveaway" is minimized. Variations in the weight of charges of product dispensed into a package, and the final package weight, will necessarily vary, regardless of the weight settings, due to the presence of many variables, such as product density, feed characteristics of the product, the physical condition of the filler, and the like.

There have been many attempts to solve this problem of assuring minimum package weight according to government regulations, and, at the same time, minimizing "giveaway" of the product, such as by the use of servo systems which automatically adjust certain predetermined weight settings of the weighing means. In some instances the servo is activated in response to every package which is under or over a preselected weight range, but this unnecessarily changes the weight setting upon the occasional occurrence of weight deviations outside of said range, and thus the setting remains in error until corrected by a servo signal from some subsequent package.

If the weights of a number of packages are plotted as the number of packages against the package weight, the resulting graph will resemble a probability curve, as shown, for example, in Muskat et al Patent No. 3,805,903. In certain instances, systems have operated on the basis of locating the servo reference weight at the center of the probability curve. Such systems operate on the principle that half of the package weights must be less (or more) than the servo reference weight. This is undesirable because, when the curve broadens due to certain conditions at the filler, an excess number of packages will be rejected as below (or above) the critical limit for the minimum acceptable package weight.

Furthermore, when there are in fact underweight packages, and this fact is determined downstream of a plurality of packages moving on a conveyor, by checkweighing at some downstream point, the package may be rejected and thereby lost. One of the features of the present invention is to obviate this disadvantage by utilizing a single weigh bucket and checkweighing the charge of product therein one or more times to be certain that the weight thereof is at least equal to the minimum package weight before it is discharged into a package.

Examples of United States patents which disclose attempts to solve the problems mentioned above, include Pat. Nos. 3,620,316; 3,643,752 and 3,805,903.

SUMMARY OF THE INVENTION

In accordance with the present invention, product is fed to a single receptacle, such as a weigh bucket, from a feeding means, and feeding of the product is cut off when a predetermined weight is sensed by a weighing means operatively associated with said receptacle, thereby constituting an initial charge of product. As is well known in the art, the feed to the receptacle of the initial charge can include bulk and dribble feed, if desired. While in the receptacle the initial charge is checkweighed, by said weighing means, and if the sensed weight is less than a predetermined weight, such as the minimum package weight desired, an additional charge of product is fed to the receptacle. Another checkweighing operation will take place after the additional charge of product has been fed to the receptacle, and if the charge fed is by means of a pulsed feed and the sensed weight is still less than the minimum package weight desired, a further charge of product may then be added to the receptacle. As an alternative, if the sensed weight is less than the minimum package weight after the checkweighing operation, the further charge can be a continuous one until the weight being sensed reaches or exceeds the minimum package weight setting, instead of being one or more pulsed feeds.

As will appear more fully hereinafter, the apparent weight which is being sensed by the weighing means is not necessarily the true weight of the product which will actually be in the receptacle. This is due to the fact that there are: material in suspension which has not yet reached the receptacle; a vertical impact force created by the product in suspension falling on the product in the bucket; the weighing means is not in its true position due to its response time; and random vibrations caused by external forces which may affect the apparent weight. As is well known, response time is that time which it takes for a weigh bucket to complete its vertical displacement due to a weight being added thereto.

The true weight of the product can be checkweighed after the weighing means reaches substantial equilibrium, or the apparent weight of material can be checkweighed before equilibrium of the checkweighing means has been reached by introducing a sensor to detect movement of the weighing means from over to under minimum package weight setting after the feedings of the product has been cut off.

In accordance with a still further aspect of the invention, the weighing means may be provided with a feed cut-off setting, a minimum package weight setting, and a servo reference weight setting, which may be equal to or greater than the minimum package weight setting. The flow of product to the receptacle will be caused to stop when the apparent weight of product in the receptacle being sensed reaches or exceeds the feed cut-off setting. There may be included in the control means an adjusting means for adjusting the feed cut-off setting of the weighing means. Such control means may become operable after the flow of product has stopped to provide a signal to the adjusting means for adjusting the feed cut-off setting, either to a lower weight setting when fewer than a certain preselected number of charges within a group of charges fall below the minimum package weight setting, or to a higher weight setting when more than another preselected number of charges within a group of charges fall below the minimum package weight setting.

Thus, the invention embodies novel means for checkweighing product in a weigh bucket before the product is discharged into a package. If the apparent weight of product in the weigh bucket is less than the minimum package weight setting, then one or more additional charges of product will be fed into the weight bucket until the minimum package weight setting has been reached. Also, the control means will operate to adjust the feed cut-off setting under certain conditions as above mentioned briefly, and which will be discussed in greater detail hereinafter.

BRIEF DESCRIPTION OF THE DRAWINGS

FIG. 1 is a schematic representation of a preferred form of the apparatus embodying the present invention, combined with logic circuitry operable each time the weighing means reaches substantial equilibrium after product feed is cut off, and the weight being sensed is less than the minimum package weight, to cause a pulsed feed of product to the receptacle to take place;

FIG. 2 is an end elevational view of a portion of the apparatus looking in the direction of the arrows 2—2 of FIG. 1.

FIG. 5 is a still further modified logic circuit using the "above to below" minimum package weight detector of FIG. 4, but wherein the additional product fed to the receptacle is a continuous feed until the minimum package weight setting is reached, instead of being one or more pulsed feeds;

FIG. 6 illustrates another logic circuit which may be used in combination with any of the circuits shown in FIGS. 1,3,4 or 5, wherein a weight servo is used in combination with a second or servo checkweighing circuit to adjust the feed cut-off setting to a different setting depending upon the number of charges of product within a group of charges which fall below a servo reference weight setting of the weighing means;

FIG. 7 is a time-weight graph illustrating the operation of the logic circuit shown in FIG. 1;

FIG. 8 is a time-weight graph illustrating the operation of the logic circuit shown in FIG. 3;

FIG. 9 is a time-weight graph illustrating the operation of the logic circuit shown in FIG. 4;

DETAILED DESCRIPTION OF THE INVENTION

Figure 3:
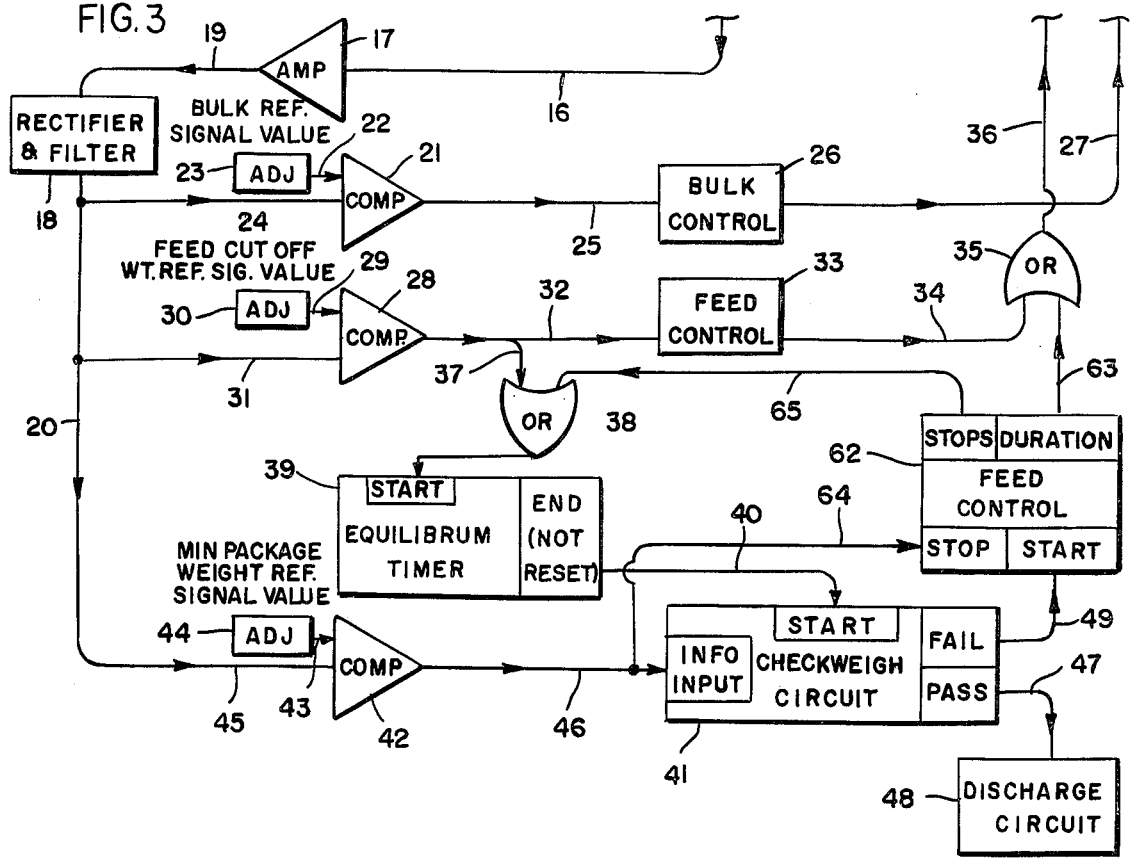
FIG. 3 is a modified logic circuit operable with the mechanical apparatus shown in FIG. 1, but wherein the circuit is operable, after product feed is cut off and the weighing means has reached substantial equilibrium and the weight being sensed is less than the minimum package weight, to cause additional product to be fed continuously until the weight being sensed reaches or exceeds the minimum package weight.

By way of some background information, it may be stated that it is fairly common in package filling machines to utilize what is known as a "bulk feed" and a "dribble feed". The "bulk feed" delivers product to a receptacle, such as a weigh bucket, at a relatively rapid rate to bring the weight of product up to a predetermined desired weight relatively fast. At some predetermined point the "bulk feed" is stopped and the "dribble feed" begins or continues until a second predetermined weight has been reached. It is to be understood, however, that this arrangement is not necessary since, in some applications, there is only one feed, and there may also be provided means for diminishing or slowing down the rate of feed as it approaches the desired minimum package weight. For purposes of illustration herein, there has been shown a feed tray which has both a "bulk feed" and a "dribble feed" and wherein a tray gate is used to stop the bulk feed, although the bulk and dribble trays could be separate.

Referring now more particularly to the drawings, and especially to FIGS. 1 and 2, it will be noted that the product to be packaged is fed first from a hopper 1 into the feed tray 2, which is customarily provided with suitable and well known vibrating means, generally indicated by the numeral 3. By vibrating the feed tray 2, product is fed continuously from the hopper 1 along the surface of the feed tray to the outer end thereof where it drops into a suitable receptacle, such as the weigh bucket 4. This bucket is normally maintained closed by means of a gate 5 mounted for rotative movement about a pivot point 6 from the closed position shown in FIG. 1 to the open position thereof shown in dotted lines, whereupon the product therein is discharged into the discharge chute 7, and then into the package 8.

The weigh bucket 4 is mounted on, and moves with, a part of a weighing means or weight sensing means 9. The bucket moves downwardly as the product is fed thereto. In the illustrated embodiment, the feed tray 2 is divided into a "bulk feed" portion 10 and a "dribble feed" portion 11. The "bulk feed" may be stopped by moving the tray gate 12 from its open position shown in FIG. 1 to a closed position across the outlet end of the "bulk feed" side 10 of the tray. This may be accomplished by a suitable means such as, for example, operation of a solenoid or fluid control means 13 which reciprocates a piston rod 14 connected by suitable linkage to the tray gate 12, which is pivoted to rotate about a point 15.

Thus, "bulk feed" is stopped by closing the tray gate 12, and "dribble feed" may be stopped by stopping operation of the vibrator 3. Product will remain in a static condition on the bottom of the feed tray 2 unless it is being vibrated in which case product will be fed to the weigh bucket. The weighing means is provided with a bulk feed cut-off setting, a dribble feed cut-off setting, and a minimum package weight setting. As the product is fed from the feed tray to the weigh bucket, the bucket will move downwardly due to the added weight therein, and when the weighing means senses the apparent weight of the product in the receptacle to be equal to the bulk feed cut-off setting, the tray gate will close. When the weighing means senses the apparent weight of product in the bucket to be equal to the dribble feed cut-off setting, the vibrator will stop.

As mentioned heretofore: material in suspension, impact, response time, and vibration will affect the weighing means so the apparent weight is seldom equal to the true weight. This difference between apparent and true weight encourages the use of checkweighing, which will occur after dribble feed stops.

One way of accomplishing the checkweighing operation would be to interpose a time delay device and then sense the actual weight of product in the receptacle after the weighing means has reached substantial equilibrium. An alternative would be to eliminate the timer and merely allow the weighing means to reach equilibrium, then provide a motion sensor to activate the checkweighing circuit when motion has stopped.

The problems involved in weighing product and sensing apparent weight of product in the receptacle will be appreciated more when it is recognized that there are a great many types and varieties of products being packaged, each of which may present different problems. For example, puffed breakfast cereals and similar products are relatively light weight, and the impact force of the product falling on product in a weigh bucket is relatively small. Products having a greater density, such as rice, nuts and the like, will produce a greater impact force and cause the weigh bucket to over-travel in its vertical displacement before completing its response time. When the material in suspension falls into the weigh bucket, this impact force will cause the weighing means to sense an apparent weight which is greater than the true weight of product actually in the receptacle. When candy bars, for example, are being fed, the impact of one candy bar could make the apparent weight considerably more than the true weight.

The term "weighing means", as used herein, is intended to embrace any type of device which will detect or sense apparent or true weight of product in a receptacle. Checkweighing may be performed each time the weighing means reaches substantial equilibrium which may be determined by various means, such as a timer or a motion detector, which detects when the weighing means has come to rest.

The broad concept of the present invention is the use of a single receptacle or weigh bucket into which product is fed from feeder means, and from which product is fed into a package, combined with weighing means having a feed cut-off setting and a minimum package weight setting, checkweighing means which will detect whether the weight being sensed by the weighing means (whether it be apparent or true weight) is over or under the minimum package weight setting, and control means to feed additional product to the receptacle if the weight being sensed is less than the minimum package weight setting. Whenever the true weight of product being sensed is equal to or over the minimum package weight setting, then product is ready to be discharged from the receptacle to the package.

In one form of the invention, when the flow of product is stopped, a timer begins and is set to time-out when the weighing means reaches substantial equilibrium. This timer is referred to herein as an "equilibrium timer". The product in the receptacle is then checkweighed, and if the weight being sensed is under the minimum package weight setting, a pulse timer causes a pulsed feed of product (a small amount) to be delivered to the receptacle from the feeder means. A pulsed feed is one which delivers a smaller amount of product to the receptacle than would occur if the additional product feed were started and the weight sensing means used to stop the feed. Subsequent checkweighing takes place as often as necessary until the weight being sensed by the checkweighing means becomes equal to or in excess of the minimum package weight, at which time the product is ready to be delivered to the package.

In another form of the invention the pulse timer is eliminated, and when the system calls for additional product, it is fed continuously until the minimum package weight setting is reached. After substantial equilibrium of the weighing means has been reached, the product is then checkweighed and, if it is over the minimum package weight, product is discharged, but if it is under the minimum package weight, (such as the case where the impact force of a candy bar may be unusually great) flow of product starts again and the operation is repeated.

In a further form of the invention and for faster cycling of the machine, checkweighing takes place before the equilibrium timer times out. This is accomplished by providing a detector for detecting movement of the receptacle or weigh bucket from a position indicating a weight above minimum package weight to a position indicating a weight below the minimum package weight. When this condition is detected, additional product is immediately fed to the receptacle, either by a pulsed feed or a continuous feed. Also, the operation of the equilibrium timer is interrupted and it is reset immediately upon operation of the detector, and checkweighing occurs after the equilibrium timer eventually times out, as described above.

A feature of the invention also involves the use of a weight servo which may be used in combination with any of the foregoing logic circuits, to adjust the feed cut-off weight setting up or down depending upon the number of packages within a group of packages which are either above or below a servo weight setting of the weighing means.

As an aid to understanding the time-weight graphs, and operation of the various logic circuits, specific weights may be used herein for illustration purposes only. For example, if it is considered that one pound packages are to be produced, then the minimum package weight setting of the weighing means would be 16 ounces. The feed cut-off weight setting might then be $15\frac{7}{8}$ ounces. Thus, when the apparent weight in the receptacle or weigh bucket reaches $15\frac{7}{8}$ ounces, the feed of product to the receptacle would be cut off. It is anticipated that the difference between the apparent weight and the true weight at the moment of feed cut-off is $\frac{1}{8}$ ounce or more, then it would be expected that the true weight of product would be equal to or more than the minimum package weight, and if the checkweighing operation proves this to be true, then product in the weigh bucket would be ready to be discharged into the package.

Also, when both bulk feed and dribble feed are used, there will be a "bulk feed" setting, which may vary depending upon the product being packaged. As an example it may be assumed that bulk feed will be cut off at say, 14 ounces. At this point then, "dribble feed" will begin until $15\frac{7}{8}$ ounce weight is sensed, at which time the dribble feed will be cut off. As mentioned hereinabove, these figures are set forth here merely by way of example for the purpose of an aid in understanding the invention. If heavier or lighter packages are to be produced, then it will be obvious that different weight settings will be used.

In each circuit there is an adjusting means for automatically adjusting the dribble feed cut-off setting. Control means include a weight servo which may become operable after the flow of product has stopped to provide a signal to the adjusting means for adjusting the dribble feed cut-off setting, either to a lower weight setting when fewer than a certain preselected number of charges within a group of charges fall below the minimum package weight setting, or to a higher weight setting when more than another preselected number of charges within a group of charges fall below the minimum package weight setting.

Thus, the invention embodies novel means for checkweighing product in the weigh bucket before the product is discharged into a package. If the apparent weight of product in the weigh bucket is less than the minimum package weight setting, then one or more additional charges of product will be fed into the weigh bucket until the minimum package weight setting has been reached. Also, the control means will operate to adjust the dribble feed cut-off weight setting under certain conditions as above mentioned briefly, and which will be discussed in greater detail hereinafter.

Referring now more particularly to FIG. 1 this circuit utilizes the equilibrium timer, pulse timer, and checkweigh circuit, wherein checkweighing occurs each time the equilibrium timer times out, and if necessary additional product is fed in pulses. The weighing means 9 is operatively associated with the receptacle or weigh bucket 4, so that, as additional weight is added to the receptacle, the weighing means will sense the apparent weight in the bucket. The weighing means is provided with a differential transformer which produces a weak alternating current weight signal, corresponding to the apparent weight in the receptacle. This signal is transmitted through line 16 to amplifier 17, thereupon producing strong alternating current weight signal which is transmitted to the rectifier and filter 18 through line 19. The signal which emanates from the rectifier and filter 18 through line 20 will then be a direct current weight signal.

The amplitude of this signal will depend upon the amount of product in the receptacle 4. Any suitable and desired ratios can be utilized, but it has been found preferable to have one ounce of weight being sensed produce a one volt weight signal, and the voltage will increase by one volt for each ounce of weight increase. If the bulk feed is to be cut off at 14 ounces, for example, the bulk feed cut-off would be set to be actuated when the weight signal then reaches 14 volts.

As a factual matter, and for ease in visually determining the true weight of the product charge being delivered to the package, when a digital read-out is provided, a negative voltage is preferred. Thus, the comparator associated with the bulk reference signal value may be adjusted to a negative 2 volts, so that, for a 16 ounce minimum package weight, and for the bulk feed to be cut off at 14 ounces, the 14 ounce apparent weight in the weigh bucket would produce a negative 2 volts rather than a positive 14 volts.

If the dribble feed cut-off weight is to be 15⅞ ounces, as stated above in the example given, then product feed would be stopped when the voltage is a negative ⅛ volts. If the minimum package weight is to be 16 ounces, then product in the weigh bucket will be ready to be discharged when the voltage reaches zero or becomes positive. In this way an overweight can be read on a digital readout immediately as a positive value above zero, which would be easier than attempting to figure the amount of a positive weight over 16 ounces.

With the foregoing in mind, and again referring to FIG. 1, the logic circuit has a first comparator 21 with two inputs. The input 22 is from the adjusting means 23 which may be manually adjusted to the bulk feed cut off value of 14 ounces or −2 volts. As product is fed to the receptacle and the negative voltage decreases due to the increased weight, when the voltage reaches −2 volts it will be transmitted to the comparator 21 through the other input 24 thereof. When the voltage of the input 24 reaches the voltage of the input 22 a signal from the comparator will be transmitted through the input line 25 to the bulk control circuit 26, which thereupon will produce a signal through line 27 to the control means for the tray gate 12. As indicated heretofore, this apparatus may be operated by a solenoid or by a fluid cylinder and piston means 13 and 14 to close the tray gate 12 thereby stopping the flow of product from the bulk feed.

The comparator 28 also has two inputs, one of which is the input 29 from the adjusting means 30, which may be set to any desired weight where all feed is to be stopped. For a 16 ounce minimum package weight and a 15⅞ ounce feed cut-off weight, the input 29 to the comparator would be adjusted to −⅛ volt. The voltage through line 20, due to the continually increasing weight in the receptacle, will increase the voltage therethrough, or will decrease the negative voltage which is delivered to the comparator 28 through line 31. When this voltage reaches −⅛ volt, for which the comparator is set, a signal will be produced by the comparator and be transmitted through the input 32 to the feed control circuit 33. This, in turn, produces a signal through line 34 to the OR gate 35. This, then, produces a signal through line 36 to the vibrating means 3 to stop operation thereof thereby stopping the dribble feed.

Simultaneously, the output from the comparator 28 will also go to the input 37 of the OR gate 38, which thereupon starts the equilibrium timer 39. This runs for a predetermined period of time during which the weighing means will be expected to reach substantial equilibrium. Depending upon the weighing means and the product being fed, this time may vary, but as a practical matter this equilibrium timer may be said to time out in ⅓ of a second.

When the timer 39 times out, a signal will be produced and transmitted to the checkweigh circuit 41 through its input 40 thereby to checkweigh and determine whether the true weight of the product in the weigh bucket is equal to, or more than or less than the minimum package weight.

The comparator 42 also has two inputs, one of which input 43, is associated with the adjusting means 44. Assuming that the minimum package weight desired is to be 16 ounces and the voltage produced is a negative voltage, the minimum package reference weight signal value will be set at a zero voltage. When the negative voltage through line 20 reaches zero, the voltage to the comparator 42 through the input 45 will equal the zero voltage to which the comparator has been adjusted, thereby producing a signal through the input 46 to the checkweigh circuit 41, which may be referred to as the "information input". If the input voltage through line 46 from the comparator 42 is equal to or in excess of the zero volts to which the comparator has been adjusted, then it may be said that the package weight "passes", whereupon a "pass signal" will be produced by the checkweigh circuit and transmitted through line 47 to the discharge circuit 48, at which time the gate 5 of the weigh bucket 4 will be opened and the product therein will be discharged through the chute 7 into the package 8.

If, however, the voltage through the input 45 to comparator 42 does not reach zero voltage, thus indicating that there is less than the minimum package weight of 16 ounces in the weigh bucket, then no signal will be delivered through the "information input" 46, at which time the checkweigh circuit determines that the product in the weigh bucket is underweight and a "fail signal" will be produced and transmitted through the input 49 to start the pulse timer 50 to pulse feed additional product to the receptacle.

The duration of the pulse timer is very short, and when this timer is started, a signal will be produced and transmitted through the input 51 of the OR gate 35 and through line 36 to the vibrator mechanism 3 thereby to start the vibrator to deliver a pulsed feed to the receptacle. At the end of the duration of the pulse timer the vibrator will be stopped to cut off the additional feed of product, and a signal is produced and transmitted through line 52 to the second input of the OR gate 38 to again start the equilibrium timer running.

Again, after the equilibrium timer has timed out, the checkweigh circuit operates as above described, and if the weight of product in the weigh bucket after equilibrium has been reached is equal to or in excess of the minimum package weight desired, then product will be discharged into the package as above described. If the weight being sensed is less than the minimum package weight, then the "fail signal" is produced and the above described procedure is repeated. This continues until the product is of sufficient weight to be discharged.

FIG. 7 is the time-weight graph which graphically illustrates the occurrences just described with respect to the circuitry of FIG. 1 by means of the motion curve as shown thereon. As product is being fed into the receptacle and the weighing means moves downwardly in response to this added weight, the weighing means will sense the apparent weight in the receptacle and will produce voltages in accordance with the apparent weight. The impact force of material falling into the receptacle may make it appear as though there is more weight in the receptacle than there is in fact. When the weighing means senses the apparent weight of $15\frac{7}{8}$ ounces which have been given herein as the example of the desired feed cut-off weight for a 16 ounce minimum package weight, which point is indicated in FIG. 7 by the numeral 53 on the curve, feed of product to the receptacle will be stopped as above described. At this point, however, there will still be material in suspension between the feeding means and the weigh bucket, which will take time $F_s$, which is the "fall time of material in suspension", to reach the surface of product already in the receptacle.

All of the product will have reached the receptacle by the end of the time period $F_s$, as indicated by the point on the curve 54 in FIG. 7. At this time the impact force of the material in suspension falling onto the surface of the product in the weigh bucket will cause the receptacle to continue to move downwardly and the curve to move upwardly, which will then cross the minimum package weight line as shown in FIG. 7 for a short time. As the weighing means seeks equilibrium, and moves upwardly from its lowermost position the motion curve will again cross the minimum package weight line as it moves downwardly if the actual weight of product in the receptacle is less than the minimum package weight.

It may be presumed that, by the time the point on the curve indicated by the numeral 55 has been reached, the weighing means will have achieved substantial equilibrium. It will also be noted that FIG. 7 illustrates graphically the starting of the equilibrium timer at the moment the apparent weight of product in the receptacle reaches the feed cut-off weight at point 53 on the curve. This timer continues until the point 55 on the curve is reached and, since this point is below the minimum package weight setting, the pulse feed timer will start and will deliver a pulsed feed of product into the receptacle. The duration of the pulse timer is indicated in FIG. 7 by the letter P. At the end of the duration of the pulse timer the equilibrium timer will again start and will again run for a time $t$ until the weighing means again reaches substantial equilibrium at which time the checkweighing occurs.

In FIG. 7, D represents the time delay due to the "fall time" of material in suspension in combination with the response time of the weighing means resulting from the pulsed feed. Thus, although the pulse timer has caused a pulsed feed of additional product to be delivered to the receptacle, the weighing means does not begin to react to the change in amount of product being added to the receptacle until the end of time D as shown at point 56 on the curve. At this point the product then adds its actual weight plus its impact force, which is sensed by the weighing means, and this pulse feed portion of the weight signal is indicated by $F_p$ in FIG. 7. At this time, point 57 on the curve shows the apparent weight as being over the minimum package weight setting, but if the true weight is less, then the weighing means will move upwardly and the curve downwardly until it again crosses the minimum package weight line and substantial equilibrium is reached at point 58 on the curve. If the true weight is still too low, another pulsed feed of product is fed, and at point 59 on the curve it will start to move upwardly past the minimum package weight line. The end of pulse feed portion $F_p$ of the weight signal is shown at point 60 on the curve. Thereafter, when the weighing means reaches substantial equilibrium at point 61 on the curve, and it is above the minimum package weight, discharge will be ready to take place.

FIGS. 3, 4, 5 and 6 are logic circuits which illustrate different ways of accomplishing the same end result as described above with respect to FIG. 1, but using different logic. Each circuit is intended to be used with the mechanical devices shown in FIGS. 1 and 2. As mentioned in describing the operation of the circuit of FIG. 1, it was pointed out that a weak alternating current weight signal was transmitted from the differential transformer in the weighing means 9 through line 16 to the amplifier 17. This also occurs in the circuits of FIGS. 3 through 6. Therefore, it is unnecessary to again repeat the showing of the mechanical apparatus, since it may be considered that operation of the circuit still includes the transmission of the alternating current weight signal through the rectifier and filter 18 thereby to produce the direct current weight signal through line 20.

In the logic circuit of FIG. 3 everything occurs as explained above with respect to FIG. 1, including the bulk weight cut-off signal, which is transmitted from comparator 21 to the bulk control circuit 26 by means of the input 25, thereby to cut off the flow of bulk product at the desired set weight. Likewise, when the dribble feed cut off weight setting is reached, the signal from comparator 28 will be transmitted to feed control 33 through its input 32 and all feed of product to the receptacle stops.

The equilibrium timer 39 operates as described above to start the checkweigh circuit after substantial equilibrium of the weighing means has been reached. In FIG. 1, however, there was a pulse timer which caused a pulsed feed of product to be delivered to the receptacle. In the logic circuit of FIG. 3, instead of a pulsed feed, the feed of product is continuous until minimum package weight has been reached.

Thus, the circuit is slightly different from the standpoint that the pulse timer is eliminated and the feed control 62 is substituted in its place. If the checkweigh circuit senses that the true weight of product in the receptacle is equal to or above the minimum package weight setting, a "pass" signal will be transmitted through line 47 to the discharge circuit 48.

On the other hand, if the weight being sensed by the checkweigh circuit is less than the minimum package weight setting, then the "fail" signal will be transmitted through line 49 to start the feed control timer 62. This provides a signal which is transmitted through the input 63 of the OR gate 35, and through line 36, which starts the vibrator and will cause product to be fed continuously for the duration of the feed control. When the apparent weight in the receptacle reaches the minimum package weight setting a signal will be transmitted from comparator 42 through line 46 and the input 64 to the feed control 62 to stop operation thereof. After the equilibrium timer times out and the weighing means has reached substantial equilibrium, and the checkweigh circuit has received information that the true weight in the weigh bucket is above the minimum package weight setting, then product will be ready to be discharged.

The time-weight graph which illustrates the operation of the logic circuit shown in FIG. 3 is shown in FIG. 8. As before, when product is being fed into the receptacle or weigh bucket and the apparent weight therein reaches the feed cut-off weight setting, feed of product will stop at point 53 on the motion curve. Also, the "fall" time of product in suspension, as indicated by $F_s$, will be the same as described above and this will occur at point 54 on the curve. The curve then moves upwardly beyond the minimum package weight setting and then below such setting until the weighing means reaches substantial equilibrium when the equilibrium timer times out at point 55 on the motion curve.

According to FIG. 8 the true weight of product in the receptacle at this time is less than the minimum package weight setting, whereupon additional product will be fed and the time D illustrates the time delay due to the combination of the "fall" time of material in suspension and response time of the weighing means. At this point weight begins to increase as shown at 56 on the motion curve. As the product continues to be fed, the motion curve moves upwardly and crosses the minimum package weight line at point 66, but due to the additional material in suspension which takes time $F_s$ to fall, the weighing means continues to move and this point is shown at 67 on the motion curve. The time of feeding to the minimum package weight is indicated by the time $F_w$ in FIG. 8.

At point 66 on the motion curve the equilibrium timer again is activated and when it times out, according to FIG. 8, the true weight of product is the receptacle as shown at point 68 on the motion curve, will be above the minimum package weight setting, whereupon the product in the receptacle will be discharged.

Figure 4:
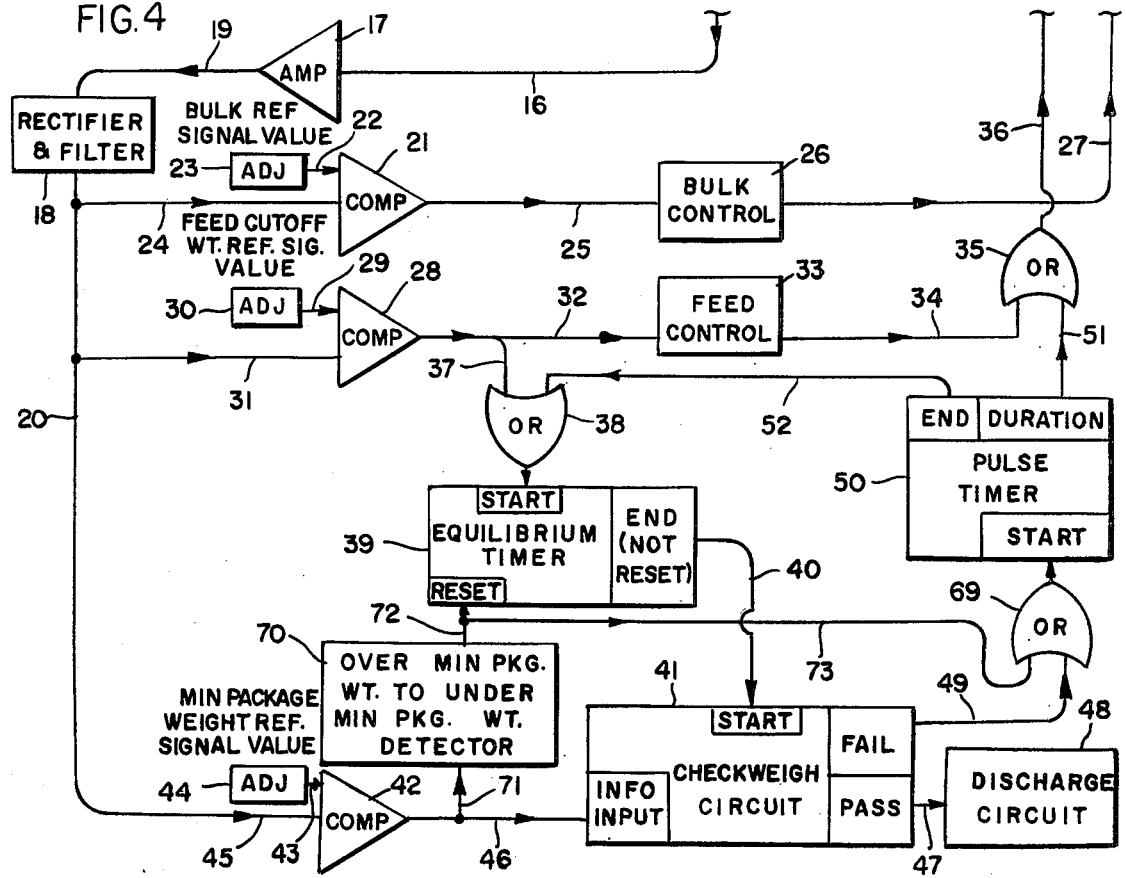
FIG. 4 is a further modified logic circuit which may be used with the apparatus, instead of the ones shown in either FIG. 1 or FIG. 3, wherein a pulsed feed of additional product is fed to the receptacle before the weighing means reaches equilibrium and as soon as the apparent weight being sensed goes from above to below the minimum package weight setting.

Referring now to the logic circuit of FIG. 4 and its corresponding time-weight graph shown in FIG. 9, this circuit again involves the use of the pulse timer 50, as in the circuit of FIG. 1, as well as the equilibrium timer 39 and the checkweight circuit 41. In this instance, however, the circuit utilizes an "over minimum package weight to under minimum package weight detector" which detects the motion of the weighing means when it goes over the minimum package weight and then returns back to a position below the minimum package weight. In this case, the equilibrium timer is not permitted to time out, but is reset when this point is detected and a pulsed feed takes place immediately.

More specifically, if the equilibrium timer 39 times out, and the checkweigh circuit senses a weight which is equal to or in excess of the minimum package weight setting, after the weighing means reaches equilibrium, a "pass" signal is transmitted to the discharge circuit, all as described hereinabove. In this instance, however, if the checkweigh circuit senses a weight which is below the minimum package weight, thereby producing a "fail" signal, instead of such signal being transmitted directly to the pulse timer, it is transmitted through line 49 to the OR gate and then to the pulse timer 50 and the operation is as described hereinabove.

The difference in this particular circuit resides in the presence of the detector 70 which, as mentioned above, detects motion of the weigh bucket when it moves from its position which it occupies when the apparent weight therein is over the minimum package weight to a position which is occupies when the apparent weight therein is under the minimum package weight. When this occurs, a signal from the comparator 42 is transmitted through line 71 to the detector 70, and then to the input 72 to reset the equilibrium timer. This timer has already begun to function as soon as the feed cut-off weight is sensed by the weighing means, but instead of allowing the equilibrium timer to time out, it is immediately reset and the signal from the detector 70 also is then transmitted to the OR gate 69 through the input 73, which thereupon activates the pulse timer 50 and immediately delivers an additional pulsed feed of product to the receptacle.

Thus, instead of waiting for the weighing means to reach substantial equilibrium before checkweighing, it may be assumed that, since the weight in the weigh bucket permits it to return to a position wherein the apparent weight therein is less than the minimum package weight, it may be assumed that additional product is going to be needed, in which case it is furnished immediately. This process is repeated each time that the receptacle moves from a position above to a position below the minimum package weight.

This may become more evident upon viewing FIG. 9 wherein the motion curve representing the apparent weight signal reaches the feed cut-off weight setting at point 53, whereupon the feed of product stops. Again, the "fall" time of material in suspension is represented by $F_s$, and ends at the point 54 on the motion curve. The impact force causes the receptacle to continue to move downwardly, and the motion curve to move upwardly across the minimum package weight setting line. If the apparent weight in the bucket is not above the minimum package weight, then, as shown by the motion curve, it crosses the minimum package weight line at the point 74, whereupon the detector 70 will immediately cause a pulsed feed to occur as described above. D, then, represents the time delay due to the "fall" time of the product in suspension in combination with the response time of the weighing means, and the pulse feed time is represented by the letter P. It will be noted that the pulse feed timer is started before the equilibrium timer $t$ times out whereupon it is immediately reset. It begins to time again at the end of the duration of the pulse feed time as shown in FIG. 9, and, at point 75 at the end of time D on the motion curve, the material in suspension has fallen, and the pulse feed portion of the weight signal begins, thereby moving the weigh bucket downwardly again so that the motion curve will again cross the minimum package weight setting line to a point thereabove.

If the product in the weigh bucket is such that the motion curve again crosses the minimum package weight line from above to below, the detector 70 will again initiate a pulsed feed, which again interrupts the running of the equilibrium timer and resets it. This process continues until the weight in the weigh bucket is sufficient so that the motion curve will stay above the minimum package weight line, thereby allowing the equilibrium timer to time out and the checkweigh circuit to sense that the weight in the receptacle is sufficient to allow discharge of the product into the package. It will be quite evident that the use of this particular circuit permits faster cycling of the machine, by reason of the fact that it is unnecessary to allow the equilibrium timer to time out after each additional feed of material.

FIG. 5 illustrates a logic circuit which is provided with the same detector 70 as heretofore described with respect to FIG. 4, and operates in the same manner except, instead of the pulse feed timer 50 shown in the circuits of FIGS. 1 and 4, there is the feed control 62, which is the same as that described with respect to FIG. 3, wherein, when motion of the receptacle from over to under the minimum package weight setting is detected, the feeding of the product begins again to add further product, but it is a continuous feed until the minimum package weight is reached, rather than the pulsed feed as described with respect to FIG. 4.

That portion of the circuit which is the same as the circuit of FIG. 4 bears the same numerals, and that portion of the circuit similar to FIG. 3 bears the same numerals as in that figure.

In this case, as soon as the weighing means senses movement of the weigh bucket from a position which it assumes when it is over the minimum package weight to a position which it assumes when it is under the minimum package weight, a signal will be transmitted through line 72 to reset the equilibrium timer 39 and simultaneously through line 73 and the OR gate 69 to start the feed control 62. This feed control stops operation as soon as the apparent weight of the receptacle reaches the minimum package weight, at which time a signal is transmitted through line 65 to the OR gate 38 to again start the equilibrium timer.

Figure 10:
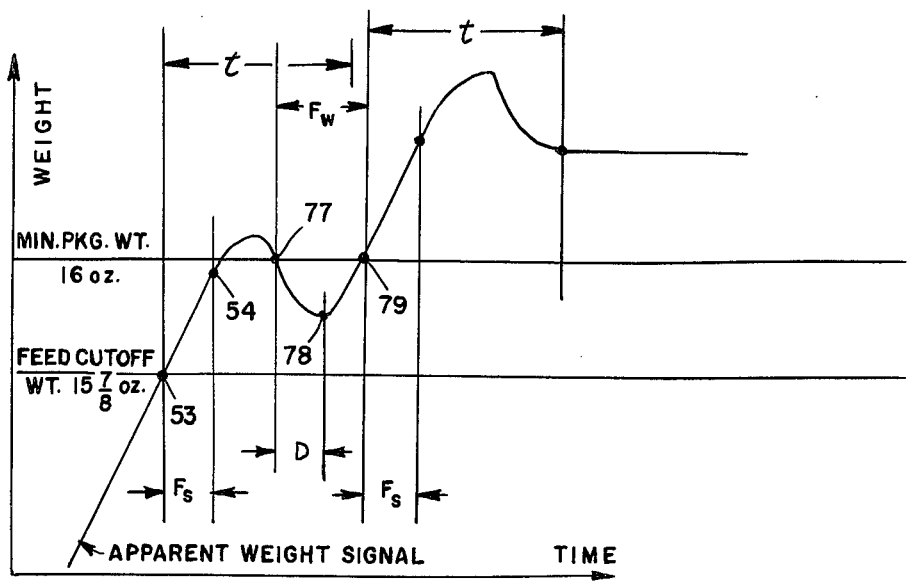
FIG. 10 is a time-weigh graph illustrating the operation of the logic circuit shown in FIG. 5.

This process is graphically illustrated in FIG. 10 in the drawings wherein the motion curve passes through the feed cut-off weight setting 53 and the point 54, which is that point which completes the "fall" time of the product in suspension and indicated by the symbol $F_s$. The motion curve then proceeds to go above the minimum package weight line and then therebelow through the point 77 and down to the point 78. At point 77 the "over to under minimum package weight detector" transmits a signal to interrupt the equilibrium timer and reset it and, at the same time, it activates the feed control 62 to begin to feed additional material. The time D is the delay due to the "fall" time of the material in suspension in combination with the response time of the weighing means and the symbol $F_w$ again indicates the time that it takes to feed product to the receptacle until it reaches minimum package weight setting, indicated at the point 79. At this point the equilibrium timer again begins to time and, in this case, the motion curve continues upwardly, indicating additional material in the receptacle, but since at no time does it recross the minimum package weight line, the equilibrium timer as indicated at $t$ will time-out and checkweigh. Since the true weight in the receptacle is above the minimum package weight, the product will be ready to be discharged.

FIG. 6 is a logic circuit which represents a weight servo system for adjusting the feed cut-off weight setting automatically, either to a higher or to a lower setting, depending upon certain circumstances which will be described in greater detail hereinafter. This weight servo logic circuit may be used with any of the circuits heretofore described as shown in FIGS. 1,3,4 and 5. FIGS. 1 and 4 utilize the pulsed feed and the equilibrium timer, but in FIG. 4 the equilibrium timer is interrupted when the detector detects a weight moving from over to under the minimum package weight. FIGS. 3 and 5 utilize the continuous addition of product until the minimum package weight is reached, rather than a pulsed feed, and in one case the equilibrium timer times out before the additional product is fed, and in the other case the over to under minimum package weight is detected. The weight servo circuit is used with any of these other circuits.

FIG. 6, therefore, illustrates primarily those elements of the circuit which are necessary to understand this part of the invention. The equilibrium timer 39 is still used, but instead of a signal being produced and transmitted to the checkweigh circuit 41, there is provided a second checkweigh circuit 80 which may be identified as the "servo checkweigh circuit" to distinguish from the first checkweigh circuit previously described which checkweighs product for the purpose of adding product when necessary to correct the weight of product to be discharged into the package. The servo checkweigh circuit is used for the purpose of determining that the true weight of a package is either over or under a servo reference weight setting. This setting can be the same as the minimum package weight setting, although as a practical matter, and more preferable, the servo weight setting will be higher than the minimum package weight setting.

Again using the weights heretofore described for purposes of illustration, where the minimum package weight desired is 16 ounces, the servo weight setting would be something above the 16 ounce weight, such as, for example, 16⅛ ounce. As will be seen shortly, the feed cut-off weight setting will be adjusted upwardly or downwardly automatically by the weight servo circuit, depending upon the number of packages within a group of packages the weights of which are over or under the servo weight setting.

A comparator 81 is provided in this circuit having the input 82 from the adjusting means 83. Through this adjusting means, the comparator 81 may be set for 16⅛ ounce which, using negative voltages, would actually be set at ⅛ volt. The direct current weight signal being transmitted from the rectifier and filter 18 through line 20 is also transmitted to the comparator 81 through its other input 84. Information as to whether the weight of such charge is over or under the servo reference weight setting will be transmitted to the servo checkweigh circuit 80 through line 85.

When the equilibrium timer times out it transmits a signal through line 40a to the AND gate 86. This is the same signal which is transmitted through line 40 to the first checkweigh circuit. The signal from comparator 42 is also transmitted to the AND gate 86 but through line 46a, so that when the equilibrium timer times out and the true weight in the receptacle is above the minimum package weight, the servo checkweigh circuit checkweighs the charge to determine whether it is over or under the servo reference weight setting. If the weight of the charge is under the servo reference weight setting this information is transmitted to the weight servo 87 by means of a signal from the servo checkweigh circuit through line 88. If, however, the weight of the charge is over the servo reference weight setting, a signal will be transmitted from the servo checkweigh circuit through line 89, which information is also received by the weight servo 87.

As mentioned above, automatic adjustment of the feed cut-off weight setting will occur if the number of charges delivered to the package within a group of charges is either over or under the servo reference weight. By way of example, if it is assumed that 25 charges comprises a group and a first preselected number within this group is 5, and if more than 5 charges in the group of 25 are under the servo reference weight, then the weight servo 87 will transmit a signal through line 90 to the adjusting means 30 to adjust the feed cut-off weight setting upwardly, because too many charges are under the servo reference weight.

Also a second preselected number may arbitrarily be assumed to be two charges within the same group of 25. If less than the two charges out of the group of 25 fall below the servo reference weight setting then the weight servo 87 will transmit a signal through line 90 to the adjusting means 30 to adjust the feed cut-off weight setting downwardly.

Thus, if no more than 5 and no less than 2 charges within a group of 25 charges are over or under the servo reference weight setting, then no adjustment will be made, and if only 2,3,4, or 5 charges in the group are neither over nor under the servo reference weight setting, this condition will be satisfactory.

Figure 11:
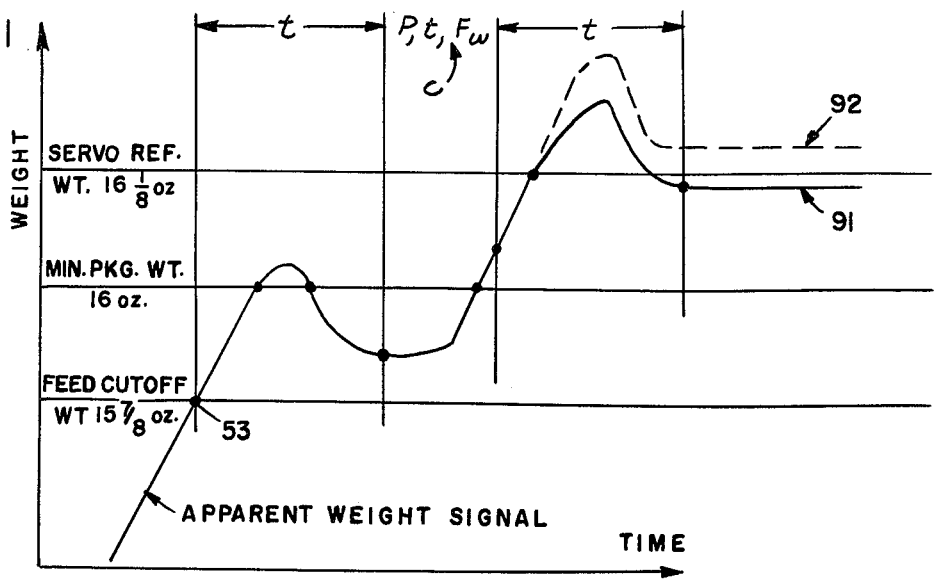
FIG. 11 is a time-weight graph illustrating the operation of the servo logic circuit shown in FIG. 6.

FIG. 11 is the time-weight graph which illustrates the operation of the servo logic circuit wherein the motion curve shows that the feed is cut off at the weight of $15\frac{7}{8}$ ounces. For illustration purposes, this curve is shown as going above and then below the minimum package weight of 16 ounces, at which time additional product is fed to the receptacle either by a pulsed feed or a continuous feed until the minimum package weight setting is reached. The time C in FIG. 11 represents the time it takes to reach the beginning of the final timing of the equilibrium timer in each cycle. During the time the C equilibrium timer could have time out product could have been added by a pulsed feed or continuous feed, or the equilibrium timer could have been interrupted by use of the over to under detector. Regardless of the particular system used, the product in the receptacle will increase the weight thereof and it may or may not reach the servo reference weight. If it does and the true weight is represented by the line 91, then this information of weight being below the servo reference weight will be transmitted to the weight servo 87. If the true weight, after the weighing means reaches substantial equilibrium, is above the servo reference weight setting, as shown by the dotted line 92 in FIG. 11, then this fact is also recorded by the weight servo.

The arrangement described herein has a number of advantages over those of the prior art. The fact that only a single weigh bucket is used lessens not only the initial cost of the machine, but also the cost of maintenance. There are fewer material handling parts, which thereupon eases the sanitation problems, as well as decreasing the damage to the product being fed. Furthermore a single weigh bucket, rather than a plurality which have been used heretofore, permits the overall height of the machine to be less, which has the advantage of making it unnecessary to convey product to as high a level, and it eliminates problems where there may be low ceilings.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

We claim:

1. Apparatus for controlling the weight of product charges fed into a vertically displaceable receptacle, comprising
   (a) bulk feeder means for feeding product to said receptacle;
   (b) dribble feeder means for feeding product to said receptacle at a rate slower than that of the bulk feed, after the bulk feed stops,
   (c) weighing means, including an electronic sensing device with related electronic circuitry, operatively associated with said receptacle and operable to detect the displacement of said receptacle thereby to sense the weight of product in said receptacle, said weighing means having
      (1) a bulk feed cut-off setting,
      (2) a dribble feed cut-off setting which is different than said bulk feed cut-off setting, and
      (3) a minimum package weight setting which is different than either of said bulk feed cut-off setting or said dribble feed cut-off setting,
   (d) bulk feed control means operable in response to said sensing device sensing said bulk feed cut-off setting to provide a signal to stop flow of product from said bulk feeder means when the apparent weight of product in said receptacle being sensed is at least equal to the bulk feed cut-off setting,
   (e) first dribble feed control means operable in response to said sensing device sensing said dribble feed cut-off setting to provide a signal to stop flow of product from said dribble feeder means when the apparent weight of product in said receptacle being sensed is at least equal to the dribble feed cut-off setting,
   (f) said weighing means also including checkweighing means operable after the flow of product to said receptacle from said dribble feeder means has stopped to determine whether the weight being sensed by said sensing device is over or under said minimum package weight setting,
   (g) second dribble feed control means operable after operation of said checkweighing means and in response thereto to provide a signal to activate the same dribble feeder means to feed a further charge of product to the same receptacle if the weight of product being sensed is less than the minimum package weight, and
   (h) means, operable when the weight of product in said receptacle being sensed by said weighing means is at least equal to the minimum package weight setting, to discharge product from said receptacle.

2. The combination of elements defined in claim 1, combined with time delay means to delay operation of said checkweighing means for a predetermined time period after flow of product from said dribble feeder means has stopped.

3. The combination of elements defined in claim 1, wherein said checkweighing means and said second dribble feed control means are operable to continue to provide subsequent signals to said feeder means to feed subsequent charges of product to the receptacle each time the flow of product from said dribble feeder means has stopped and whenever the weight of product being sensed by said weighing means is less than the minimum package weight setting, until the weight of product being sensed is at least equal to the minimum package weight setting.

4. The combination of elements defined in claim 1, wherein said further charge of product fed by said dribble feeder means and activated by said second dribble feed control means is a pulsed feed.

5. The combination of elements defined in claim 1, wherein said further charge of product fed by said dribble feeder means and activated by said second dribble feed control means is a continuous feed until the weight of product being sensed is at least equal to the minimum package weight setting.

6. The combination of elements defined in claim 1 including
(a) equilibrium timing means operable when flow of product to said receptacle from said dribble feeder is stopped, to delay operation of said second dribble feed control means until said weighing means has reached substantial equilibrium.

7. The combination of elements defined in claim 1 wherein said weighing means also has a servo reference weight setting, and combined with
(a) adjusting means for adjusting the dribble feed cut-off setting,
(b) control means operable after the flow of product from said dribble feeder has stopped to provide a signal to said adjusting means
(1) for adjusting said feed cut-off setting to a higher weight setting when more than a first preselected number of charges within a group of charges fall below the servo reference weight setting, and
(2) for adjusting said feed cut-off setting to a lower weight setting when less than a second preselected number of charges within a group of charges fall below the servo reference weight setting.

8. The combination of elements defined in claim 1, wherein said feed cut-off setting is increased each time the sensed weight of charge falls below the servo reference weight setting beyond the preselected number of charges within said group of charges.

9. The combination of elements defined in claim 7, combined with means to render said control means inoperative to adjust said feed cut-off setting when the number of charges below said servo reference weight setting are neither more than said first preselected number of charges, nor less than said second preselected number of charges.

10. The combination of elements defined in claim 1 combined with a motion sensor to detect when said weighing means has reached substantial equilibrium and to delay operation of said second dribble feed control means until substantial equilibrium of said weighing means has been reached.

11. Apparatus for controlling the weight of product charges fed into a receptacle, comprising
(a) feeder means for feeding product to said receptacle to deposit an initial charge therein,
(b) weighing means operatively associated with said receptacle and operable to sense the weight of product in said receptacle, said weighing means having
(1) a feed cut-off setting, and
(2) a minimum package weight setting which is different than said feed cut-off setting,
(c) means to stop flow of product to said receptacle when the apparent weight of product in said receptacle being sensed is equal to the feed cut-off setting,
(d) checkweighing means operatively associated with said weighing means and operable after the flow of product to said receptacle has stopped to determine whether the weight being sensed by said weighing means is over or under said minimum package weight setting,
(e) equilibrium timing means operable when flow of product to said receptacle is stopped, to delay operation of said checkweighing means until said weighing means has reached substantial equilibrium,
(f) control means operable after operation of said checkweighing means to provide a signal to activate said feeder means to feed a further charge of product to the initial charge in said receptacle if the weight of product being sensed is less than the minimum package weight setting, and
(g) detecting means operable during operation of said equilibrium timing means to provide a signal to reset said equilibrium timing means and actuate said control means, whenever said detecting means detects movement of the apparent weight being sensed by said weighing means from over the minimum package weight setting to under the minimum package weight setting.

12. The combination of elements defined in claim 11, wherein said further charge of product fed by said feeder means and activated by said control means upon actuation by said detecting means is a pulsed feed.

13. The combination of elements defined in claim 11, wherein said further charge of product fed by said feeder means and activated by said control means upon actuation by said detecting means, is a continuous feed until the weight of product being sensed is at least equal to the minimum package weight setting.

* * * * *

UNITED STATES PATENT AND TRADEMARK OFFICE
CERTIFICATE OF CORRECTION

PATENT NO. : 4,100,984

DATED : July 18, 1978

INVENTOR(S) : Klopfenstein et al.

It is certified that error appears in the above-identified patent and that said Letters Patent are hereby corrected as shown below:

Col. 1, line 8: change "change" to --charge--;

Col. 11, line 55: change "is" to --in--;

Col. 14, line 10: change "as" to --and--;

Col. 15, line 47: change "time" to --timed--; and after "out" insert --and--.

Signed and Sealed this

Thirtieth Day of January 1979

[SEAL]

Attest:

RUTH C. MASON
Attesting Officer

DONALD W. BANNER
Commissioner of Patents and Trademarks